S. E. CREASEY.
CONVERTIBLE VEHICLE.
APPLICATION FILED AUG. 16, 1920.
1,388,028.
Patented Aug. 16, 1921.
2 SHEETS—SHEET 1.
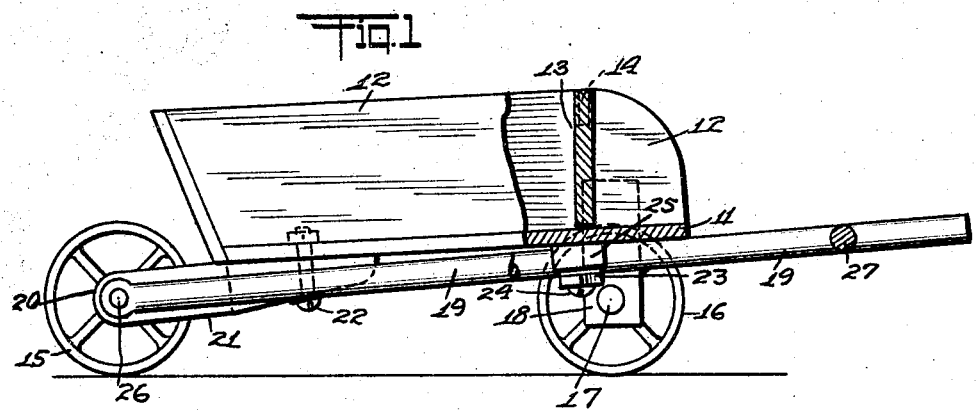
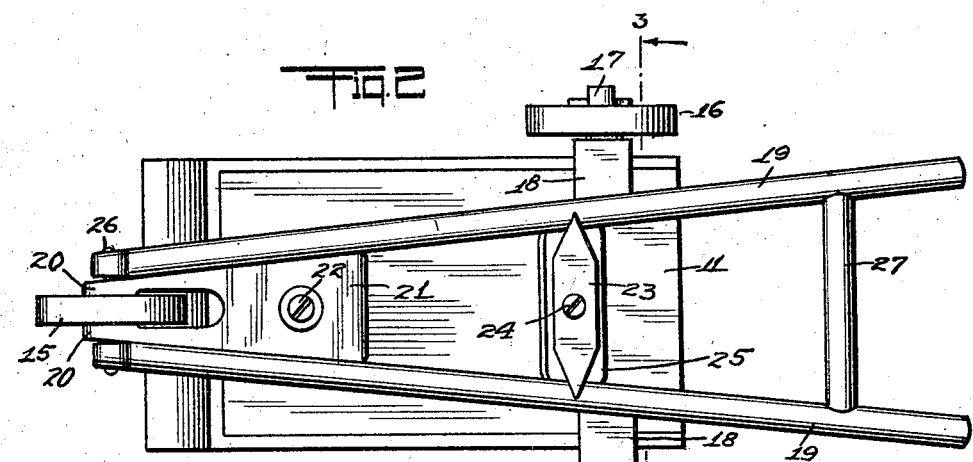
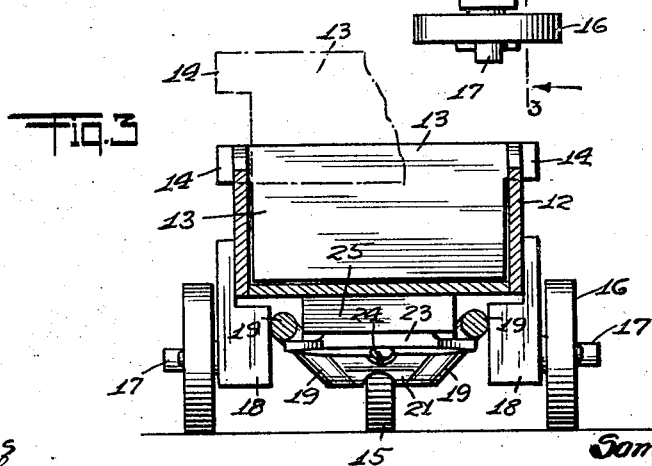
WITNESS
M. E. Lessin
Inventor
Samuel E. Creasey
By his Attorney S. E. CREASEY.
CONVERTIBLE VEHICLE.
APPLICATION FILED AUG. 16, 1920.
1,388,028.
Patented Aug. 16, 1921.
2 SHEETS—SHEET 2.
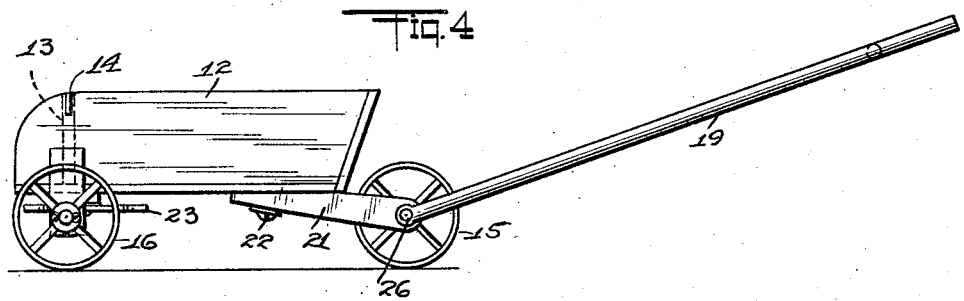
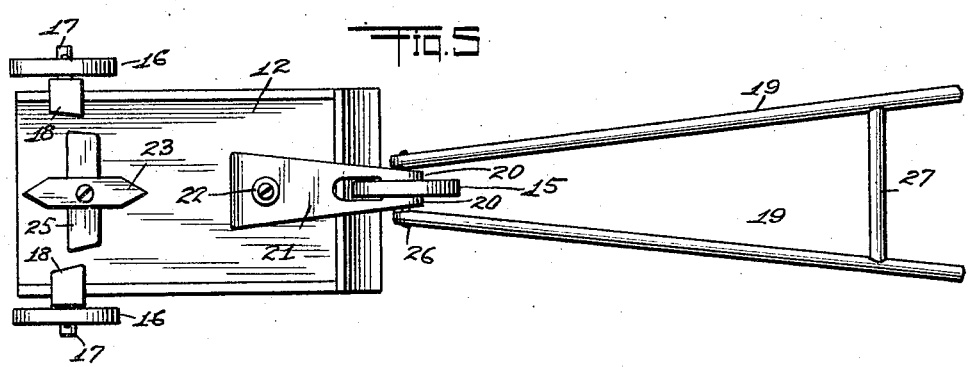
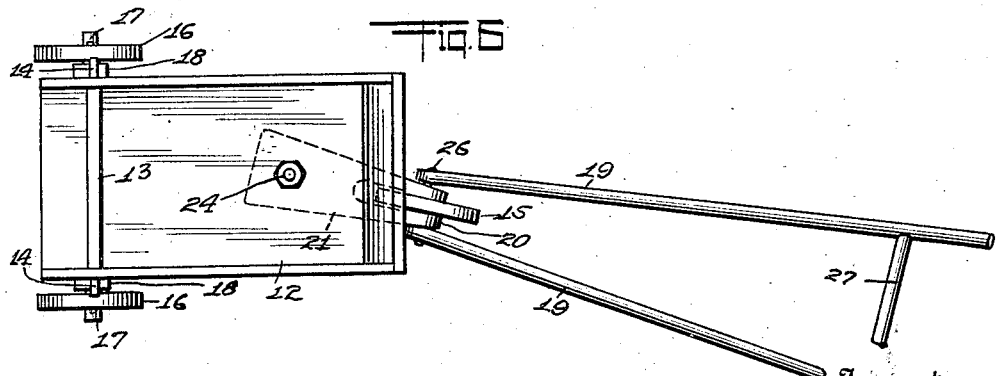
Inventor
Samuel E. Creasey
By his Attorney
Witness
M. E. Lessin

UNITED STATES PATENT OFFICE.

SAMUEL E. CREASEY, OF SANFORD, MAINE.

CONVERTIBLE VEHICLE.

1,388,028.	Specification of Letters Patent.	Patented Aug. 16, 1921.

Application filed August 16, 1920. Serial No. 403,875.

*To all whom it may concern:*

Be it known that I, SAMUEL E. CREASEY, a citizen of the United States, and a resident of Sanford, in the county of York and State of Maine, have invented certain new and useful Improvements in Convertible Vehicles, of which the following is a full, clear, and exact description.

Among the principal objects which the present invention has in view are to adapt a vehicle of the character mentioned for propulsion either by pushing or pulling; to provide means for steering the apparatus when the same is being drawn; to lock the steering wheel rigidly so that the same will not move out of its fixed relation to the body of the vehicle when the same is being pushed; and to simplify and cheapen the construction.

Drawings.

Figure 1 is a side elevation partly in section of a vehicle constructed and arranged in accordance with the present invention;

Fig. 2 is a bottom plan view of the same;

Fig. 3 is a vertical cross section, the section being taken as on the line 3—3 in Fig. 2, the broken lines in the figure showing a fragment of the tail gate with which the vehicle is provided in its lifting position;

Fig. 4 is a side view on reduced scale of the vehicle, the parts whereof are disposed in position for drawing the vehicle;

Fig. 5 is a bottom plan view of the same;

Fig. 6 is a top plan view showing the steering wheel and parts connected therewith in position to swing the vehicle on the curved path.

Description.

As seen in the drawings the vehicle has a body provided with a floor 11, side boards 12, and a tail board 13. The side boards 12 are preferably permanently mounted on the body but may be made removable in the manner similar to the side boards of the usual dumping wheelbarrow. The tail board 13 is provided with extensions 14, which drop into recesses provided for them in the side boards 12. The body normally rests on three carrying wheels, said wheels being indicated in the drawings by the numerals 15 and 16. The wheels 16 are permanently attached to the body 12, being provided with journals 17 set out from the bracket blocks 18. The bracket blocks 18 are extended from the body of the vehicle, as best shown in Fig. 3 of the drawings. The blocks 18 while serving as supports for the journals 17 operate as guides or retainers for the hand bars 19. The wheel 15 serves a double function. When the vehicle is arranged as a wheelbarrow, the wheel 15 is the sole rotary support, the loaded body being carried by the hand bars 19 and the wheel 15. The wheel 15 is held in front of the body by the bracket arms 20 extended from the swivel block 21. The swivel block 21 is pivotally attached to the floor 11 of the body portion by a wing bolt 22. The bolt 22 permits the block 21 to swing about on the said bolt, so that the said wheel may be shifted to operate as a pilot wheel for the vehicle when the same is arranged as in the positions shown in Figs. 4 to 6 of the drawings. When the parts are arranged in the positions shown in Figs. 1 to 3, inclusive, it will be noted that the block 21 is held firmly between the contracted ends of the bars 19, and is prevented from swinging on the bolt 22.

Normally, or when the vehicle is used as a wheelbarrow, the bars 19 are held permanently in relation to the body of the vehicle by a swinging latch bar 23. The latch bar 23 is pivotally mounted by means of a bolt 24 on a block 25. The block 25 rests snugly between the bars 19 when the same are bolted against the floor 11 of the vehicle body. In this position, if it is desired to maintain the disposition which the hand bars assume when the vehicle is employed as a wheelbarrow, the latch bar is swung to the position of the view in Fig. 2 of the drawings. The bar 23 has sufficient resiliency to ride over the hand bars, and to force the same home against the floor 11.

As shown clearly in the drawings, when desired the hand bars 19 may be arranged as shown in Figs. 1 to 3, inclusive, to form the vehicle into a manually manipulated wheelbarrow.

The operator grasping the ends of the hand bars 19 lifts the body of the vehicle and load thereon on to the wheel 15; the vehicle is then propelled in the manner usual to wheelbarrows, and guided in the same way. If, however, it becomes desirable to convert the vehicle into a hand-drawn one, this is accomplished by rotating the bar 23 to the position substantially as shown in Fig. 5 of the drawings, when the hand bars 19 are at liberty to be rotated upon the axle 26 to be extended from the free end of the block 21. It will now be noted that the block 21 is free to turn on the bolt 22, to any desired position. To facilitate the manipulation of the hand bars 19, they are provided with a cross bar 27, which can be easily gripped by the operator. The vehicle now moves on the three wheels 15 and 16.

*Claims.*

1. A vehicle as characterized having a single pilot carrying wheel; hand bars pivotally connected therewith in line with the axis thereof, said hand bars being adapted to swing in front of and to the rear of said wheel; means mounted on said vehicle for holding said hand bars rigidly in rearwardly extended disposition; and means for mounting said wheel on said vehicle to permit a lateral swing of said wheel relative to said vehicle, said means embodying a swivel block and king bolts for attaching the same to the body of the vehicle, said swivel block having forwardly extending arms for supporting the axle of said wheel.

2. A vehicle as characterized having a single pilot carrying wheel; hand bars pivotally connected therewith in line with the axis thereof, said hand bars being adapted to swing in front of and to the rear of said wheel; means mounted on said vehicle for holding said hand bars rigidly in rearwardly extended disposition, said means embodying a swinging latch bar; and a swivel block, said swivel block being adapted to rest between and retain in position said hand bars.

3. A vehicle as characterized having a wheel supported pilot; a handle pivotally connected therewith, said handle being adapted to swing in front of and to the rear of said pilot; means mounted on said vehicle for holding said handle rigidly in rearwardly extended position, said means embodying a swinging latch bar; and a swivel block on said pilot adapted to engage said handle when the same is rearwardly disposed for immovably fixing the operating position of said pilot.

SAMUEL E. CREASEY.